(12) United States Patent
Nguyen

(10) Patent No.: US 6,754,280 B2
(45) Date of Patent: Jun. 22, 2004

(54) METHOD FOR DEALING WITH MISSING OR UNTIMELY SYNCHRONIZATION SIGNALS IN DIGITAL COMMUNICATIONS SYSTEMS

(75) Inventor: Phuong Vinh Nguyen, Cotati, CA (US)

(73) Assignee: Next Level Communications, INC., Rohnert Park, CA (US)

( * ) Notice: Subject to any disclaimer, the term of this patent is extended or adjusted under 35 U.S.C. 154(b) by 0 days.

(21) Appl. No.: 10/235,533

(22) Filed: Sep. 6, 2002

(65) Prior Publication Data

US 2003/0002587 A1 Jan. 2, 2003

Related U.S. Application Data

(63) Continuation of application No. 09/583,947, filed on May 31, 2000, now Pat. No. 6,470,049.

(51) Int. Cl.[7] .............................................. H04N 7/12
(52) U.S. Cl. ............................................... 375/240.28
(58) Field of Search ...................... 331/11, 25; 348/500, 348/541; 370/516; 375/240.01, 240.12–240.16, 240.26–240.28, 362, 374–376; 386/65, 112; H04N 7/12, 7/32

(56) References Cited

U.S. PATENT DOCUMENTS

| | | | |
|---|---|---|---|
| 4,855,828 A | * | 8/1989 | Lendaro ..................... 348/541 |
| 5,072,195 A | * | 12/1991 | Graham et al. ................ 331/25 |
| 5,245,631 A | | 9/1993 | Pirim |
| 5,442,400 A | | 8/1995 | Sun et al. |
| 5,652,627 A | | 7/1997 | Allen |
| 5,828,414 A | | 10/1998 | Perkins et al. |
| 5,859,949 A | | 1/1999 | Yanagihara |
| 5,883,924 A | | 3/1999 | Siu et al. |
| 5,892,535 A | | 4/1999 | Allen et al. |
| 5,995,156 A | | 11/1999 | Han et al. |
| 6,026,232 A | | 2/2000 | Yogeshwar et al. |
| 6,041,161 A | * | 3/2000 | Okamoto et al. ........... 386/112 |
| 6,069,855 A | | 5/2000 | Fuma et al. |
| 6,072,369 A | * | 6/2000 | Dhong et al. ............... 370/516 |
| 6,175,385 B1 | | 1/2001 | Kohiyama et al. |
| 6,208,643 B1 | | 3/2001 | Dieterich et al. |
| 6,215,834 B1 | * | 4/2001 | McCollough ................ 375/374 |
| 6,226,447 B1 | | 5/2001 | Sasaki et al. |

* cited by examiner

Primary Examiner—Richard Lee
(74) Attorney, Agent, or Firm—Technology Patents & Lisensing, Inc.

(57) ABSTRACT

A method for handling missing or untimely synchronization signals in digital communications systems. Upon detecting the absence of a synchronization signal, an estimation of the absent synchronization signal is made based on a plurality of previously received synchronization signals, and the estimated synchronization signal is used in place of the absent synchronization signal. The estimated synchronization signal is corrected upon the receipt of a subsequent synchronization signal.

12 Claims, 6 Drawing Sheets

METHOD FOR DEALING WITH MISSING OR UNTIMELY SYNCHRONIZATION SIGNALS IN DIGITAL COMMUNICATIONS SYSTEMS

This application is a Continuation of 09/583,947, filed May 31, 2000, now U.S. Pat. No. 6,470,049.

FIELD OF THE INVENTION

The present invention relates to methods for dealing with missing or untimely signals in digital communications systems. More particularly, the present invention relates to methods for handling missing or untimely synchronization signals, including MPEG Program Clock Reference (PRC) signals, in digital communications systems.

BACKGROUND OF THE INVENTION

An important constraint in communications systems is the capacity or bandwidth of communications channels. Bandwidth limitations may, for example, limit the amount of information that can be transmitted using a particular channel. Accordingly, considerable effort has been devoted to the development of techniques for compressing the information of a voice conversation or a video program, for example, so that such information can be transmitted using a channel with restricted bandwidth. Compression techniques known to those of skill in the art allow multiple digitized video programs, such as movies, to be transmitted across communications channels that have a fixed amount of bandwidth. Such channels include those derived using twisted wire pair cable, which were historically installed in local telephone systems, and which were designed primarily for analog voice communication.

A digitized video program, which typically comprises one video signal, one or more audio signals, and one or more data signals, may be compressed by an encoder using a standard such as ISO/IEC Standard 13818, also known as MPEG-2, which is know to those of skill in the art. This may involve, among other techniques, organizing the video program into frames, compressing the video information (for example by eliminating or reducing redundant information in each frame, as well as in adjacent frames), and producing information that enables a decoder or a receiver to "decompress" or restore the original video program from the compressed information.

Because video compression may employ both temporal as well as spatial compression techniques, an encoder may reorder the compressed video frames before transmitting them. Under such circumstances, the encoder typically embeds synchronization signals in the header of the compressed video frames that tell the decoder when to decode and when to present the corresponding frames. Synchronization signals also help the decoder to keep the video and audio data of each program locked together.

When multiple programs are multiplexed into a transport stream, an encoder may also need to embed an additional synchronization signal into the transport stream. This additional synchronization signal, which is referred to as the Program Clock Reference (PCR) in the MPEG-2 standard, represents the system clock used to encode a particular program. The system clock signal needs to be transmitted to the decoder in order to help the decoder properly decode and display programs that were encoded using different clocks. That is, time stamps and other synchronization signals embedded by an encoder into a compressed program are only meaningful if the encoder system clock can be recreated at the decoder.

After a transport stream consisting of multiple compressed programs has been encoded and assembled, the transport stream may also be packetized and passed on to a lower layer in the communications network, which may repacketize the transport stream and embed further information, such as Forward Error Correction (FEC) information, before actually transmitting the stream across a network. For example, MPEG transport stream packets may be placed into a Convergence Sublayer Protocol Data Unit (CS-PDU), mapped into multiple Asynchronous Transfer Mode (ATM) cells, and finally transmitted to a receiving system across an ATM network using twisted wire cable, fiber optic cable, or radio or other communications media.

As the digital signals in ATM cells travel through an ATM network, the signals, including synchronization signals, can be corrupted due to cell loss, cell misrouting, and bit errors that occur during transmission. In addition, network congestion and traffic conditions may lead to the delay in the transmission or receipt of the digital signals, including the synchronization signals. Because the efficiency of ATM and other packet networks relies in part on the ability of receivers in the networks, as well as the networks themselves, to deal with occasional packet delay and packet loss, it is inevitable that synchronization and other types of signals transmitted across such networks will occasionally be delayed, corrupted, or lost altogether. When compressed video programs are transmitted across packet networks, such delays, corruption, and losses of synchronization signals typically result in a reduction in the quality of the video image presented or displayed at the receiver, or the loss of the image altogether.

For the foregoing reasons, there is a need for a method of enabling decoders and other digital communications systems receivers to continue to operate when synchronization signals are either delayed, corrupted, or lost altogether.

SUMMARY OF THE INVENTION

The present invention is directed to a method for dealing with or handling missing or untimely synchronization signals, such as Presentation Time Stamp (PTS) and Program Clock Reference (PCR) signals, in digital communications systems. Under normal operating conditions, a decoder or other type of receiver receives periodic synchronization signals. In the present invention, when the decoder detects the absence of a synchronization signal, it estimates what the absent synchronization signal would have been, based on the previously received synchronization signals. The decoder then uses the estimated synchronization signal in place of the absent synchronization signal.

In a preferred embodiment, when the decoder receives a subsequent, valid synchronization signal, it corrects the previous estimated synchronization signal, based on the valid synchronization signal. Correcting the estimated synchronization signal results in improved estimation of future missing synchronization signals.

The MPEG-2 standard provides for the transmission of three types of compressed video frames. An Intra-frame, or I-frame, is a complete, digitized video frame that can be decoded without reference to any other frame. A Prediction frame, or P-frame, does not include a complete video image; rather, a P-frame includes information that enables the decoder to predict, with an acceptable degree of accuracy, what the video frame should display, based on prior I-frames or P-frames. A Bi-directional frame, or B-frame, also does not include a complete video image; rather, a B-frame includes information that enables the decoder to predict what the video frame should display, based on either prior or subsequent I-frames or P-frames. If a B-frame depends on a subsequent I-frame or P-frame, the decoder needs to transmit the subsequent I-frame or P-frame prior to the B-frame.

Thus, an I-frame may itself be thought of as a type of synchronization signal, as I-frames "reset" the decoder, in that the decoder can decode I-frames without reference to any previously received frames.

When a decoder detects the absence of an I-frame, the present invention teaches that the decoder should keep decoding and processing subsequently-received P-frames and B-frames as if the I-frame had been received. Although the resulting picture quality will not be perfect, it has been found that it will be acceptable, especially in narrowband transmission networks such as twisted wire pair cable networks. Furthermore, it has also been found that the picture quality will improve as more P-frames and B-frames are decoded and presented subsequent to the missing I-frame.

Alternatively, the decoder can construct a "null" I-frame, comprising an estimated synchronization signal and no video data, and decode the "null" I-frame in place of the absent I-frame. As before, the estimated synchronization signal can be corrected when the next valid synchronization signal is received, so as to improve the quality of future synchronization signal estimates.

Sometimes synchronization signals are received by a decoder, but on an untimely basis. For example, variations in queueing delays in network switches can result in packet delay variation, or jitter. The presence of jitter introduced by the underlying network or by the protocol layers below the MPEG-2 layer may distort the reconstructed clock at the MPEG-2 decoder. That, in turn, may degrade the quality of the video frames when the synchronization signals are generated from the recovered clock.

Although an MPEG decoder is designed to adjust its phase-locked loop (PLL) to match the frequency of the PCR signal transmitted by an encoder, jitter can result in a phase error between the decoder's PLL and the PCR signal. According to the present invention, the PLL should be adjusted based on the phase error, but only if the phase error is below a predetermined phase error threshold. If the phase error is at or above the predetermined phase error threshold, the decoder should determine if the error is a spike or an anomaly. If it is, the phase error should be ignored. If it is not, the decoder's PLL should be adjusted based on a large-error-correction procedure. This avoids adjusting the PLL by the entire amount of the phase error, which could cause undesirable artifacts in the presented image. The specific parameters of the large-error-correction procedure depend on the particular system configuration (e.g., whether the underlying communications network system is an Asymmetric Digital Subscriber Loop (ADSL) system, a Very-high-speed Digital Subscriber Loop (VDSL) system, or a satellite system).

In addition, the present invention teaches that a decoder can increment an error count every time it detects a phase error, so that the decoder can be reset when the error count reaches a predetermined threshold.

It is an object of the present invention to improve the performance of MPEG decoders and other digital receivers in the absence of synchronization signals.

It is another object of the present invention to enable an MPEG decoder or other type of digital communications receiver to handle missing synchronization signals.

It is a further object of the present invention to enable an MPEG decoder or other type of receiver to estimate absent synchronization signals based on previously received synchronization signals.

It is a further object of the present invention to enable an MPEG decoder or other type of receiver to correct an estimated synchronization signal upon receipt of a subsequent valid synchronization signal.

It is a further object of the present invention to enable an MPEG decoder to handle missing I-frames.

It is a further object of the present invention to reduce the effects of jitter in synchronization signals such as Program Clock Reference (PRC) signals.

The foregoing and other features, aspects, and advantages of the present invention will become more apparent from the following detailed description, which should be read in conjunction with the accompanying drawings.

BRIEF DESCRIPTION OF THE DRAWINGS

The accompanying drawings, which are incorporated into and form a part of the specification, illustrate the embodiments of the present invention and, together with the description, serve to explain the principles of the invention.

In the drawings.

DETAILED DESCRIPTION OF THE PREFERRED EMBODIMENTS

Figure 1:
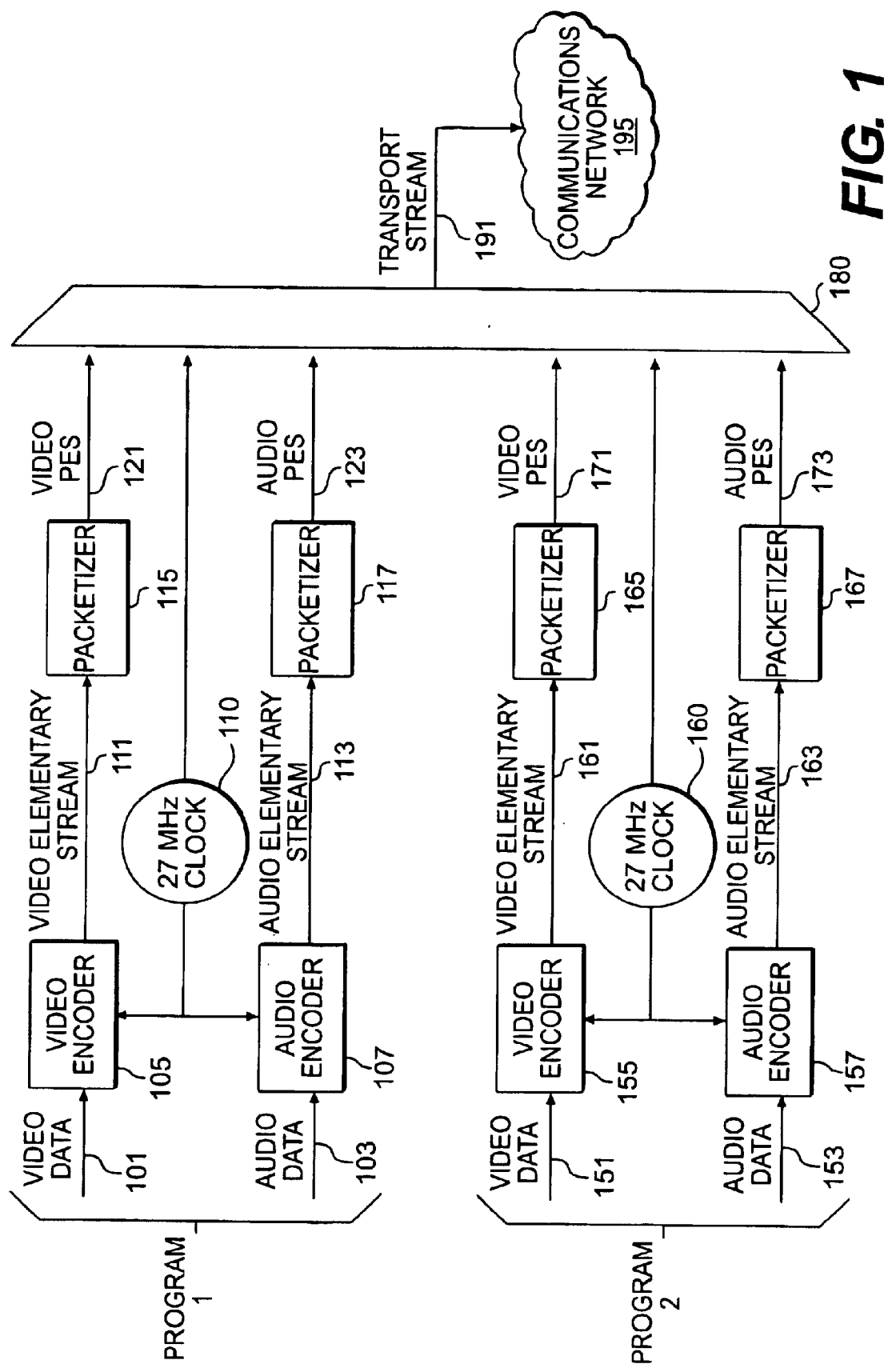
FIG. 1 illustrates an MPEG-2 encoder that compresses and transmits multiple programs across a communications network.

The present invention will now be described with reference to the accompanying drawings, which are provided as illustrative examples of preferred embodiments of the present invention. In describing the preferred embodiments illustrated in the drawings, specific terminology is used for the sake of clarity. However, the invention is not intended to be limited to the specific terms that are selected. Rather, each specific term is intended to include all equivalents that operate in a similar or substantially similar manner to accomplish a similar or substantially similar result.

With reference to the drawings in general, and FIGS. 1 through 6 in particular, the methods of the present invention are disclosed.

FIG. 1 illustrates an MPEG-2 encoder that compresses and transmits multiple programs across a communications network. As depicted in FIG. 1, Program 1 is comprised of video data stream 101 and audio data stream 103. Video encoder 105 encodes video data stream 101 into an MPEG video elementary stream 111. Packetizer 115 then packetizes video elementary stream 111 into a video packetized elementary stream (PES) 121. Similarly, audio encoder 107 encodes audio data stream 103 into an MPEG audio elementary stream 113. Packetizer 117 then packetizes audio elementary stream 113 into an audio PES 123. A 27 MHz clock 110 drives both video encoder 105 and audio encoder 107.

As shown in FIG. 1, the video and data signals comprising Program 2 undergo a similar process. Video encoder 155 encodes video data stream 151 into video elementary stream 161, which packetizer 165 then packetizes into video PES 171. Audio encoder 157 encodes audio data stream 153 into audio elementary stream 163, which packetizer 167 then packetizes into audio PES 173. Clock 160 drives both video encoder 155 and audio encoder 157. Although clock 110 and clock 160 are both nominally 27 MHz clocks, their actual frequencies may differ slightly.

In the configuration shown in FIG. 1, each program has one video data stream and one audio data stream. In alternative configurations (not shown), a program may have no video or audio stream, or multiple video or audio streams. Alternatively, a program may also have data streams that represent neither video nor audio signals.

Returning to the configuration shown in FIG. 1, video PES 121, audio PES 123, and clock 110 signals are fed into transport stream multiplexer 180. Video PES 171, audio PES 173, and clock 160 signals are also fed into transport stream multiplexer 180. In an alternative configuration (not shown), either only one program, or three or more programs may be fed into a transport stream multiplexer. As depicted in FIG. 1, transport stream multiplexer 180 multiplexes the compressed video and data signals of Program 1, the compressed video and data signals of Program 2, a program clock reference (PCR) signal that represents clock 110, and a program clock reference (PCR) signal that represents clock 160, into a combined MPEG transport stream 191. Transport stream 191 is then transmitted across communications network 195.

Figure 2:
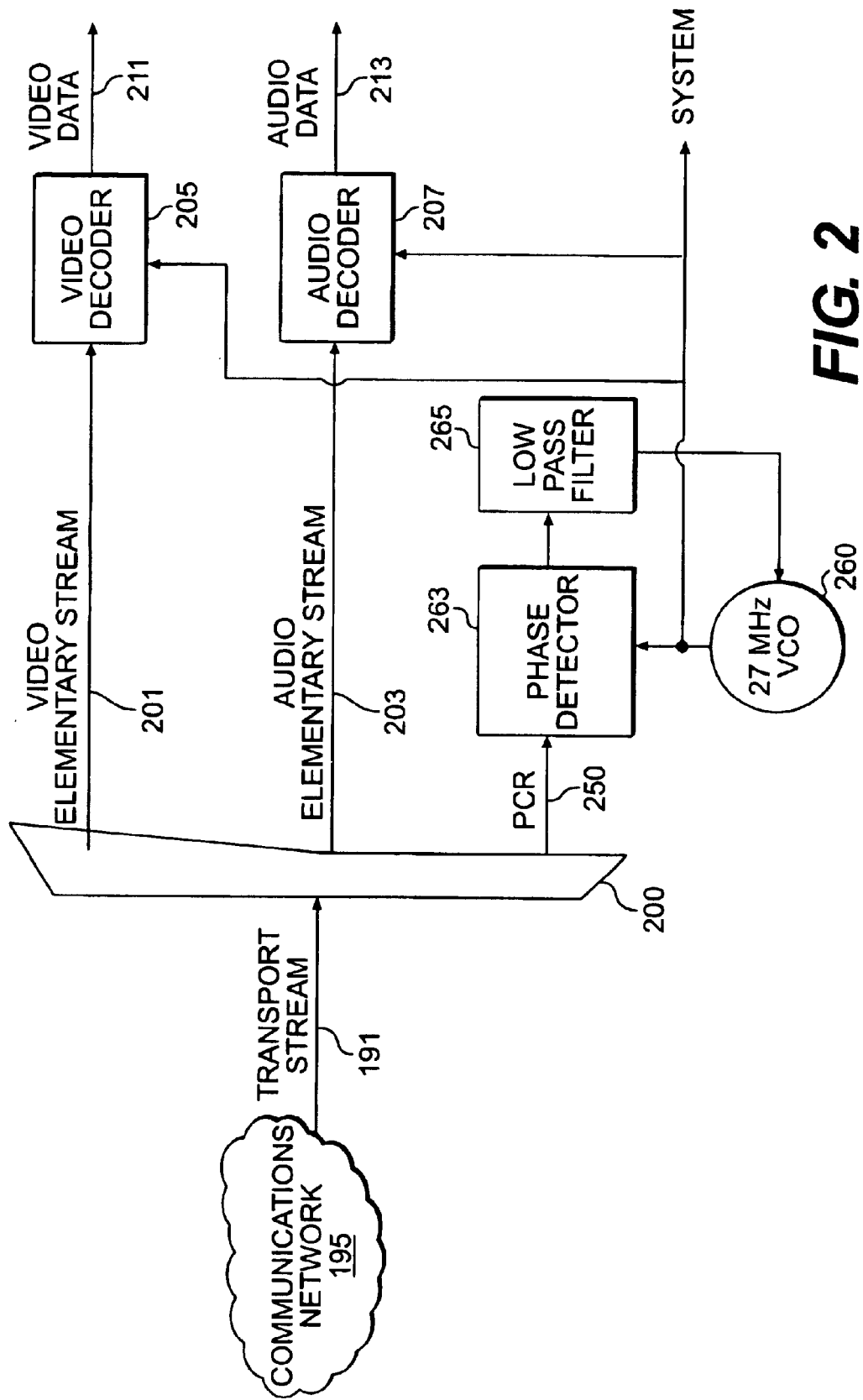
FIG. 2 illustrates an MPEG-2 decoder in which the methods of the present invention may be utilized.

FIG. 2 illustrates an MPEG-2 decoder in which the methods of the present invention may be utilized. As shown in FIG. 2, transport stream decoder 200 receives MPEG transport stream 191 from communications network 195. Transport stream decoder 200 then selects the video and audio streams that correspond to the program that is to be decoded. In the configuration shown in FIG. 2, transport stream decoder 200 feeds video elementary stream 201 into video decoder 205, which decodes video elementary stream 201 into video data stream 211. Similarly, transport stream decoder 200 feeds audio elementary stream 203 into audio decoder 207, which decodes audio elementary stream 203 into audio data stream 213. In an alternative configuration (not shown), multiple video, audio, or data streams may be decoded.

As depicted in FIG. 2, transport stream decoder 200 also feeds the PCR signal corresponding to the clock of the program being decoded into a phase-locked loop (PLL). More specifically, the MPEG-2 decoder shown in FIG. 2 comprises 27 MHz voltage-controlled oscillator (VCO) 260, whose output clocks the MPEG-2 decoder. Phase detector 263 measures the phase difference between the clock signal generated by VCO 260 and PCR signal 250. As depicted in FIG. 2, the phase difference is filtered through low-pass filter 265 and fed back into VCO 260. The feedback into VCO 260 is designed to adjust VCO 260 to match PCR signal 250.

Figure 3:
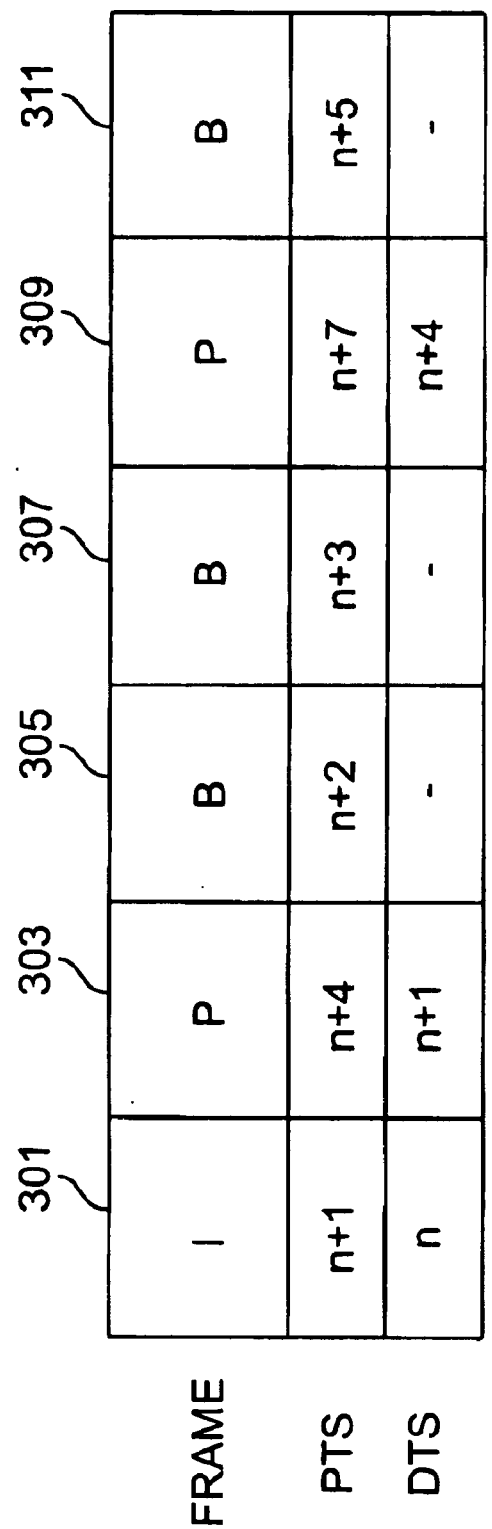
FIG. 3 illustrates a simplified MPEG-2 elementary stream.

FIG. 3 is a simplified depiction of an MPEG-2 video elementary stream. The segment of the stream shown in FIG. 3 is comprised of six frames. The frames are either I-frames, P-frames, or B-frames. Encoded with each frame in FIG. 3 is a Presentation Time Stamp (PTS), which instructs the decoder when to present or display the corresponding frame, and a Decode Time Stamp (DTS), which instructs the decoder when to decode the corresponding time stamp. Both time stamps are needed because bi-directional temporal compression requires frames to be sent to the decoder out of sequence. Thus, in the example shown in FIG. 3, P-frame 303, which is to be presented at time n+4, is sent to the decoder before B-frame 305 and B-frame 307, which are to be presented at times n+2 and n+3, respectively. This is because the decoder may need to refer to P-frame 303 before it can decode B-frame 305 and B-frame 307. As the Decode Time Stamps (DTS) show, in the example depicted in FIG. 3, the decoder is to decode P-frame 303 at time n+1, decode B-frame 305 as soon as it is received and present it at time n+2, decode B-frame 307 as soon as it is received and present it at time n+3, and present P-frame 303 at time n+4.

Figure 4:
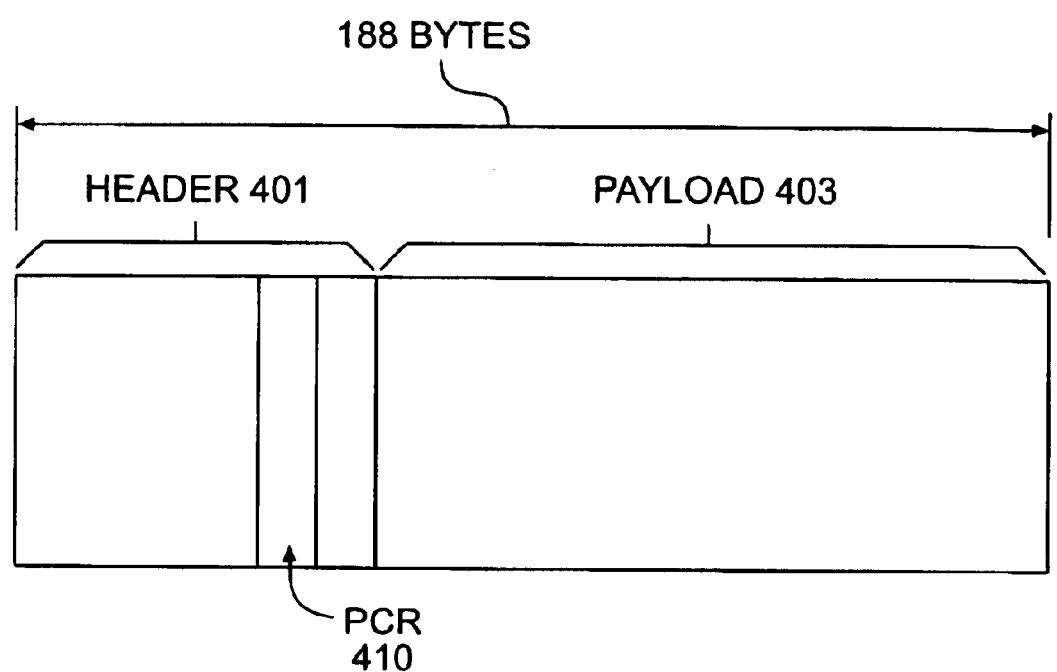
FIG. 4 illustrates an MPEG-2 transport stream packet.

FIG. 4 is an illustration of an MPEG-2 transport stream packet. In the illustration shown in FIG. 4, the overall length of the transport stream packet is fixed at 188 bytes, but the length of the packet header (and correspondingly the length of the packet payload) may vary. In the example shown in FIG. 4, the packet header 401 comprises a Program Clock Reference (PCR) signal 410, which represents the 27 MHz clock used by the encoder of the payload data.

Figure 5:
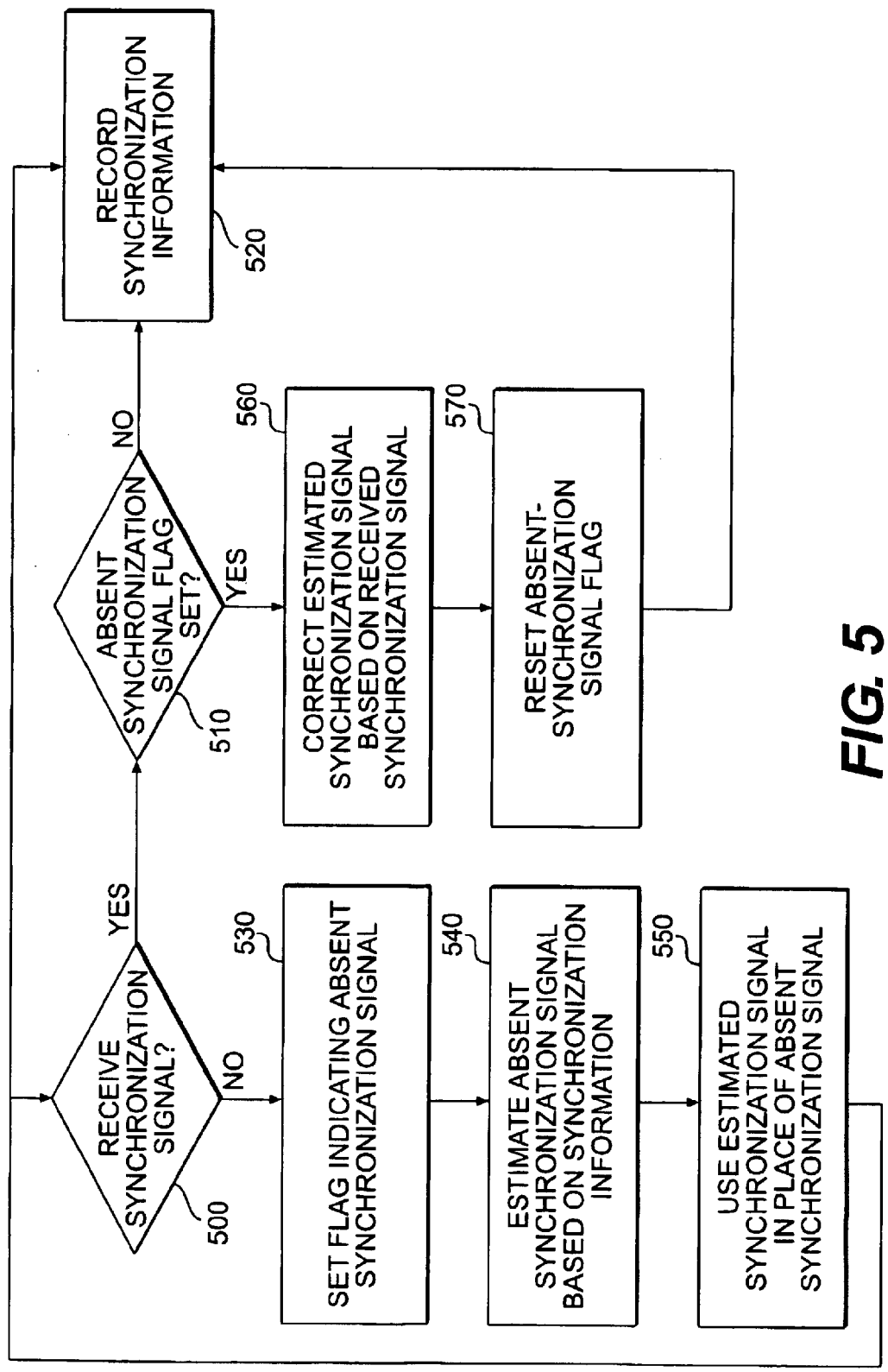
FIG. 5 provides a flow chart depicting a preferred embodiment of the method of the present invention for handling missing synchronization signals.

FIG. 5 provides a flow chart depicting a preferred embodiment of the method of the present invention for handling missing synchronization signals. In Step 500 of the embodiment depicted in FIG. 5, the MPEG decoder determines if it receives a synchronization signal. If so, the method proceeds to Step 510, where the decoder determines whether the absent-synchronization-signal flag is set. Under non-error conditions, the flag will not be set, and the method proceeds to Step 520, where it records synchronization information based on the received synchronization signals. In a preferred embodiment, the recorded synchronization information may simply comprise a log of the received synchronization signals. In an alternative preferred embodiment, the recorded synchronization information may be a histogram of the interarrival times of the synchronization signals. Following Step 520, the method proceeds back to Step 500, where the decoder again determines if it receives a synchronization signal.

In the preferred embodiment shown in FIG. 5, if the decoder does not receive a synchronization signal, it proceeds to Step 530, where it sets a flag indicating an absent synchronization signal, and then to Step 540, where it estimates the absent synchronization signal based on recorded synchronization information. In a preferred embodiment in which the recorded synchronization information comprises a histogram of the interarrival times of the synchronization signals, the estimated synchronization signal may be the arrival time of the previous synchronization signal plus the mean of the histogram of the interarrival times of the synchronization signals.

As shown in FIG. 5, in a preferred embodiment the method then proceeds to Step 550, where the estimated synchronization signal is used in place of the absent synchronization signal. In a preferred embodiment depicted in FIG. 5, the method then returns to Step 500, where the decoder again determines if it receives a synchronization signal.

As described above, when the decoder receives a synchronization signal, the preferred embodiment depicted in FIG. 5 proceeds to Step 510, where the decoder determines whether the absent-synchronization-signal flag is set. In the preferred embodiment shown in FIG. 5, if the flag is set, the method proceeds to Step 560, where the previously estimated synchronization signal is corrected based on the received synchronization signal. In an alternative preferred embodiment (not shown), the correction of the estimated synchronization signal may also be based on the recorded synchronization information. Returning to the preferred embodiment depicted in FIG. 5, the method then proceeds to Step 570, where the absent-synchronization-signal flag is reset, and then to Step 520, where the method records synchronization information based on the received synchronization signals. Following Step 520, the preferred embodiment of the method shown in FIG. 5 proceeds back to Step 500, where the decoder again determines if it receives a synchronization signal.

Figure 6:
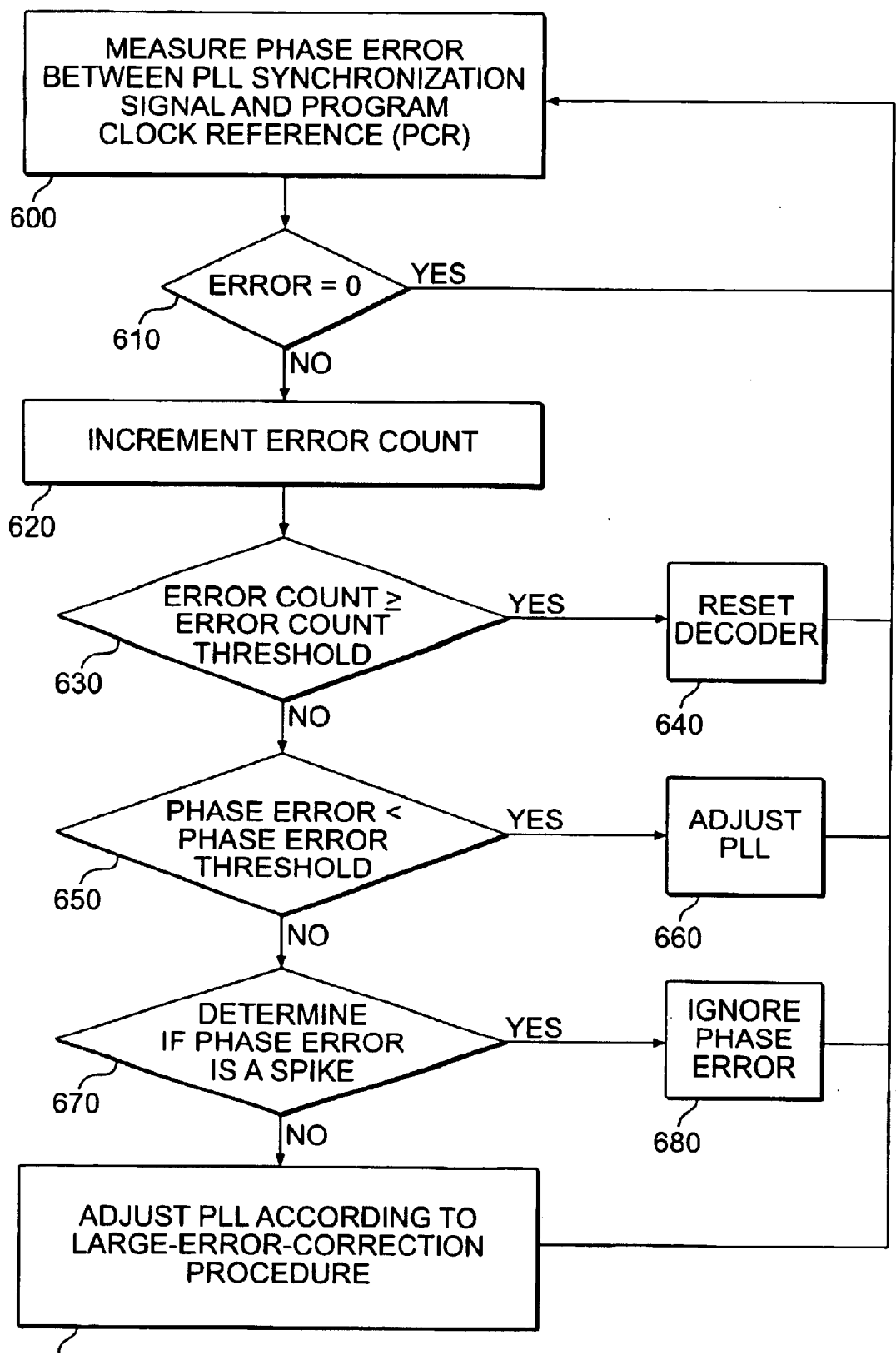
FIG. 6 provides a flow chart depicting a preferred embodiment of the method of the present invention for handling untimely synchronization information.

FIG. 6 provides a flow chart depicting a preferred embodiment of the method of the present invention for reducing the effects of untimely synchronization signals. In Step 600 of the embodiment depicted in FIG. 6, a phase error is measured between the signal generated by the phase-locked Loop (PLL) of the decoder and the Program Clock Reference (PCR) synchronization signal received by the decoder.

As shown in Step 610, if there is no phase error, the method returns to Step 600, where it again measures the phase error between the decoder's PLL signal and the received PCR signal.

In the preferred embodiment shown in FIG. 6, if there is a phase error, the method proceeds to Step 620, where it increments an error count, and then to Step 630, where the error count is compared against a predetermined error count threshold. If the error count exceeds the error count threshold, the preferred embodiment of the method depicted in FIG. 6 proceeds to Step 640, where it resets the decoder, and then starts over at Step 600.

As shown in the preferred embodiment depicted in FIG. 6, if the error count is below the error count threshold, the method proceeds to Step 650, where the phase error is compared to a predetermined phase error threshold.

In the preferred embodiment depicted in FIG. 6, if the phase error is below the phase error threshold, the method proceeds to Step 660, where the decoder PLL is adjusted based on the measured value of the phase error. Following Step 660, the preferred embodiment of the method shown in FIG. 6 returns to Step 600, where the method starts over.

If the phase error exceeds the predetermined phase error threshold, the preferred embodiment of the method shown in FIG. 6 proceeds to Step 670, where a determination is made if the phase error is a spike or an anomaly, meaning that a similarly large error has not occurred within a predetermined previous time period. In a preferred embodiment involving a VDSL transmission system in a communications networks comprised of twisted wire pair cables, the predetermined time period is approximately 0.75 milliseconds.

In the preferred embodiment depicted in FIG. 6, if it is determined that the phase error is a spike, the phase error is simply ignored, as shown in Step 680, since the phase error is likely to have been caused by a noise burst or other anomaly that is not likely to occur again.

In a preferred embodiment, if it is determined that the phase error is not a spike, the decoder PLL needs to be adjusted. However, the PLL should not be adjusted by the entire phase error, as doing so may cause undesirable artifacts in the presented image. Rather, the PLL is preferably adjusted according to a large-error-correction procedure, as shown in Step 690 of the preferred embodiment shown in FIG. 6. Such a procedure may involve adjusting the PLL by a predetermined fixed amount, or by a fraction of the measured phase error.

In a preferred embodiment involving a VDSL transmission system over a communications network comprised of twisted wire pair cables, the decoder stores both the maximum correction that the PLL can tolerate, and an average of the magnitude of previous PLL error corrections. If the measured phase error is substantially larger than the maximum tolerable PLL correction—e.g., 3–4 times larger than the maximum tolerable correction—the PLL is adjusted by the maximum tolerable correction. Otherwise, the PLL is adjusted by the average of previous PLL error corrections. Other suitable procedures will be apparent to those of skill in the art.

As depicted in FIG. 6, in a preferred embodiment, after the phase error is either ignored in Step 680 or acted upon in Step 690, the method returns to Step 600, where the method starts over.

Although the invention has been particularly described by reference to specific embodiments, it should be readily apparent to those of ordinary skill in the art that various changes and modifications may be made in form and details without departing from the spirit and scope of the invention. The appended claims are intended to cover such changes and modifications, so as to afford broad protection to the invention and its equivalents.

What is claimed is:

1. In a digital decoder including a Phase-Locked Loop (PLL) that generates a synchronization signal, wherein the digital decoder receives a plurality of Program Clock Reference (PCR) signals, a method for reducing the effect of jitter in the PCR signals, comprising the steps of:

a) measuring a phase error between the PLL synchronization signal and the received PCR signal;

b) adjusting the PLL based on the phase error if the phase error is below a predetermined phase error threshold;

c) determining, when the phase error is above a predetermined phase error threshold, whether the phase error is a spike;

d) ignoring the phase error if the phase error is a spike; and e) adjusting the PLL according to a predetermined large-error-correction procedure if the phase error is not a spike.

2. In a digital decoder including a Phase-Locked Loop (PLL) that generates a synchronization signal, wherein the digital decoder receives a plurality of Program Clock Reference (PCR) signals, a method for reducing the effect of jitter in the PCR signals, comprising the steps of:

a) measuring a phase error between the PLL synchronization signal and the received PCR signal;

b) adjusting the PLL based on the phase error if the phase error is below a predetermined phase error threshold;

c) incrementing an error count responsive to the phase error; and d) resetting the digital decoder if the error count reaches a predetermined error count threshold.

3. In a digital decoder including a Phase-Locked Loop (PLL) that generates a synchronization signal, wherein the digital decoder receives a plurality of Program Clock Reference (PCR) signals, a method for reducing the effect of jitter in the PCR signals, comprising the steps of:

a) measuring a phase error between the PLL synchronization signal and the received PCR signal;

b) adjusting the PLL based on the phase error if the phase error is below a predetermined phase error threshold;

c) determining, when the phase error is above a predetermined phase error threshold, whether the phase error is a spike;

d) ignoring the phase error if the phase error is a spike;

e) adjusting the PLL according to a predetermined large-error-correction procedure if the phase error is not a spike;

f) incrementing an error count responsive to the phase error; and g) resetting the digital decoder if the error count reaches a predetermined error count threshold.

4. A method for reducing the effect of jitter when decoding a digital communication stream, the method comprising:

receiving synchronization signals within the digital communication stream;

generating a clock synchronization signal;

measuring a phase error between the clock synchronization signal and a received synchronization signal;

comparing the phase error to a predetermined phase error threshold;

adjusting the clock synchronization signal based on said comparing;

determining if the phase error is a spike; and ignoring the phase error if said determining determines that the phase error is a spike.

5. The method of claim 4, wherein said adjusting includes adjusting the clock synchronization signal based on the phase error if said comparing determines phase error is below a predetermined phase error threshold.

6. The method of claim 4, wherein said adjusting includes adjusting the clock synchronization signal based on said comparing and said determining.

7. The method of claim 4, wherein the digital communication stream is a digital video stream.

8. The method of claim 7, wherein the received synchronization signal is a program clock reference (PCR) signal.

9. The method of claim 4, wherein said generating includes generating the clock synchronization signal using a phase locked loop (PLL).

10. A method for reducing the effect of jitter when decoding a digital communication stream, the method comprising:

receiving synchronization signals within the digital communication stream;

generating a clock synchronization signal;

measuring a phase error between the clock synchronization signal and a received synchronization signal;

comparing the phase error to a predetermined phase error threshold;

adjusting the clock synchronization signal based on said comparing; and determining if the phase error is a spike;

wherein said adjusting includes adjusting the clock synchronization signal according to a predetermined large-error-correction procedure if said comparing determines phase error is above a predetermined phase error threshold and if said determining determines that the phase error is not a spike.

11. A method for reducing the effect of jitter when decoding a digital communication stream in a device, the method comprising:

receiving synchronization signals within the digital communication stream;

generating a clock synchronization signal;

measuring a phase error between the clock synchronization signal and a received synchronization signal;

comparing the phase error to a predetermined phase error threshold;

adjusting the clock synchronization signal based on said comparing;

incrementing an error count responsive to said measuring a phase error;

comparing the error count to a predetermined error count threshold; and resetting the device if said error count comparing determines that the error count reached the predetermined error count threshold.

12. A method for reducing the effect of jitter when decoding a digital communication stream in a device, the method comprising:

receiving synchronization signals within the digital communication stream;

generating a clock synchronization signal;

measuring a phase error between the clock synchronization signal and a received synchronization signal;

comparing the phase error to a predetermined phase error threshold;

adjusting the clock synchronization signal based on said comparing;

incrementing an error count responsive to said measuring a phase error;

comparing the error count to a predetermined error count threshold; and resetting the device if said error count comparing determines that the error count reached the predetermined error count threshold.

* * * * *